UNITED STATES PATENT OFFICE.

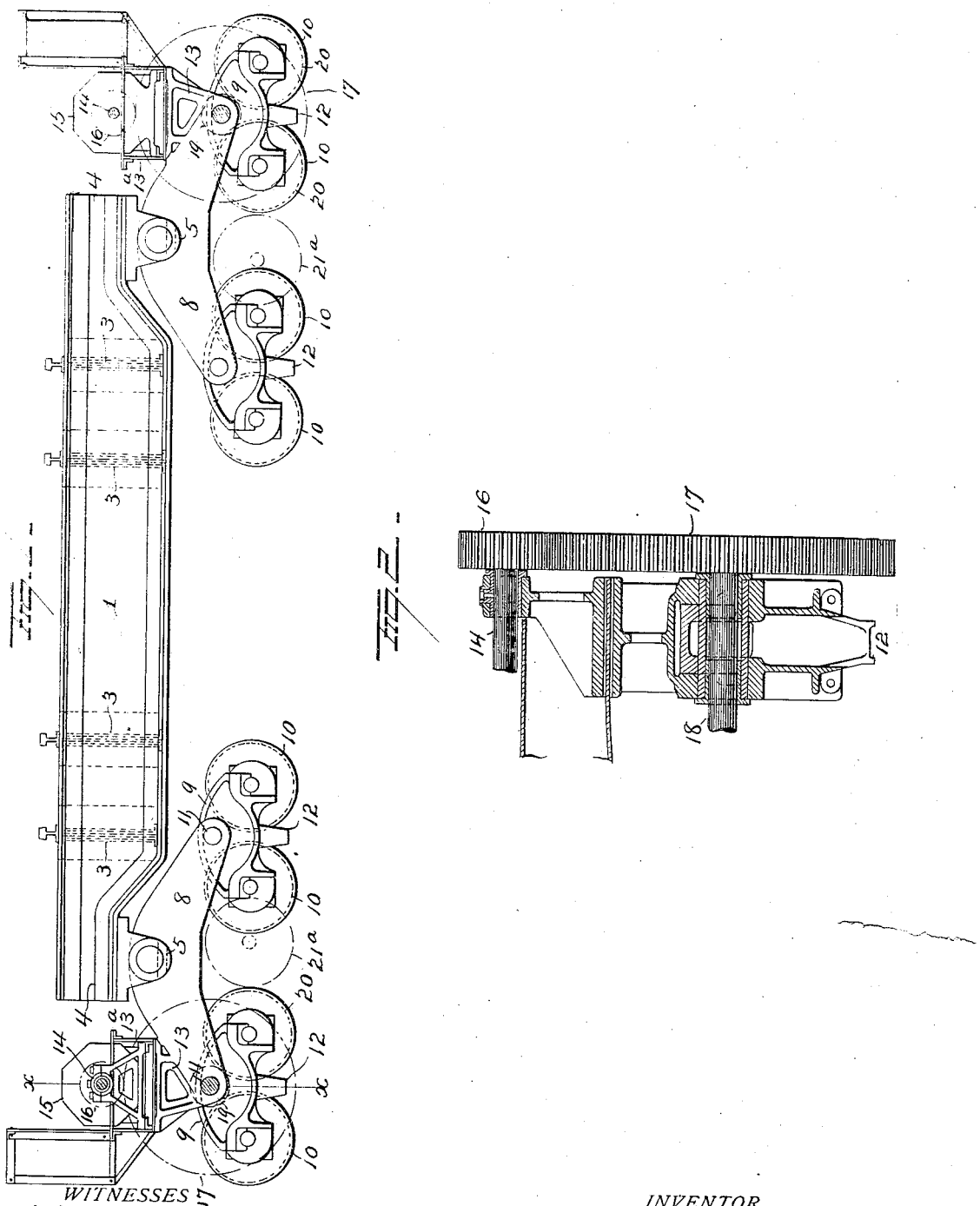

CLARENCE L. TAYLOR, OF ALLIANCE, OHIO, ASSIGNOR TO THE MORGAN ENGINEERING COMPANY, OF ALLIANCE, OHIO.

OVERHEAD TRAVELING CRANE.

968,813.　　　　Specification of Letters Patent.　Patented Aug. 30, 1910.

Application filed August 20, 1909. Serial No. 513,845.

*To all whom it may concern:*

Be it known that I, CLARENCE L. TAYLOR, of Alliance, in the county of Stark and State of Ohio, have invented certain new and useful Improvements in Overhead Traveling Cranes; and I do hereby declare the following to be a full, clear, and exact description of the invention, such as will enable others skilled in the art to which it appertains to make and use the same.

My invention relates to improvements in overhead traveling cranes, and it consists in mounting the travel motor and gearing for the bridge, on the bridge trucks or on a support carried by the latter.

My invention further consists in mounting the bridge on pivoted truck frames, and supporting the travel motor and gearing directly or indirectly on said pivoted frames.

In the accompanying drawings, Figure 1 is a view in end elevation of a crane bridge embodying my invention and Fig. 2 is a view in section on the line x, x, of Fig. 1.

The traveling bridge comprises two end carriages 1 (only one of which is shown) and girders 3 connecting the end carriages.

In the drawings I have shown a bridge for a ladle crane with four main girders 3 on which the main trolley travels, the hoist cables from the trolley (not shown) passing down between each pair of girders. I would have it understood however that the invention may be applied to bridge having but two girders on which the main trolley travels, hence I do not confine my invention to any particular construction of bridge.

The ends of the end carriages are reduced in depth at their ends as shown at 4, and secured to the underside of each reduced end is the bearing 5 to which the bridge carrying trucks are pivotally connected. Each carrying truck comprises one compensating frame 8 to which the bridge is pivoted, and two wheel trucks 9 to which the ends of the compensating frame is pivoted. There is one carrying truck at each of the four corners of the bridge, and each wheel truck 9, is mounted on two flanged truck wheels 10. These trucks 9 are journaled on the bearings 11 carried by the compensating frame 8, and each wheel truck is provided centrally between its ends with an integral guard or safety shoe 12, the lower edges of which are grooved and rest but slightly above the top surfaces of the rails on which they travel so that in the event of breakage of any of the wheels or truck frames, or truck wheel axles, the safety shoes will make contact with the rails and support the parts, and prevent derailment of any of the trucks.

The compensating frames 8 are each provided with a fixed or integral seat 13, located over the pivoted bearings of the outer wheel truck 9 at each corner of the bridge. The two seats 13 at opposite ends of the bridge constitute supports for the girder 13$^a$, which latter extends lengthwise the bridge parallel with the main girder thereof and connects the compensating frames at the opposite ends of the bridge. This girder 13$^a$ forms a support for the bridge drive shaft 14 and motor 15, the latter being preferably located at or near the center of the girder 13$^a$, and also forms a foot walk from one end of the crane to the other.

The shafts 14 may be the armature shafts as shown, or they may be coupled up to the armature shafts, and each carries at each end a pinion 16 meshing with a larger toothed wheel 17, mounted on a shaft 18 coincident with bearing 11 of the wheel trucks 9. These shafts 18 each carry a smaller pinion 19 meshing with the drive pinion 20 fixed to the axles of the truck wheels 10. By this arrangement the trucks at the opposite sides and ends of the bridge are positively driven, and as the drive motors are carried on the compensating frames and are concentric with the axes of the wheel trucks, it follows that the several wheel trucks can follow any inequalities in the track, without binding or straining the motors or gearing and without any danger of disengagement of any of the wheels of the drive gearing.

As shown in Fig. 1 the compensating frames at the rear of the bridge may also carry a girder 13$^a$ and a motor, and gearing may be provided on this rear girder 13$^a$ for propelling the rear wheels. By this arrangement the wheels of the four trucks will be positively driven. Again if desired the track wheels of the inner sets of trucks may be geared up to the wheels of the outer trucks by gear wheel 21$^a$ as shown in Fig. 1 so that all the wheels of each truck will be driving wheels. Again while I have described each truck as being mounted on two flanged track wheels, it is clearly evident that I may employ four wheels arranged in pairs, to a truck, with parallel rails on which the wheels travel.

It is evident that many slight changes might be resorted to in the relative arrangement of parts shown and described without departing from the spirit and scope of my invention hence I would have it understood that I do not wish to confine myself to the exact construction and arrangement of parts shown but, Having fully described my invention what I claim as new and desire to secure by Letters-Patent, is:—

1. In a traveling crane, the combination with wheel trucks arranged in pairs, and a compensating frame for each pair of trucks, each compensating frame being pivotally connected at its ends to its trucks, of a bridge pivotally supported at its two ends on said compensating frames, drive motor and gearing and means connected with a compensating frame and supporting said motor.

2. In a traveling crane, the combination with wheel trucks arranged in four pairs, and a compensating frame pivotally connecting each pair of wheel truck frames, of a bridge pivotally mounted on the series of compensating frames, and a drive motor and gearing mounted on the compensating frames at each side of the bridge.

3. In a traveling crane, the combination with a bridge, of a compensating frame to which the bridge is pivotally connected, and a pair of wheel trucks pivotally supporting said compensating frame, of a drive motor, carried by said compensating frame and gearing connecting said motor with the truck wheels.

4. In a traveling crane the combination with a crane bridge, compensating frames on which the bridge is mounted, and a pair of trucks carrying each compensating frame, of a motor supported independently of the crane bridge, and gearing connecting said motor with the wheels of a truck.

5. In a traveling crane, the combination with a crane bridge, compensating frames pivotally supporting said bridge, and a pair of trucks for each compensating frame, of means connecting two compensating frames on the same side of the crane, a motor carried by said connecting means, and gearing connecting said motor with the wheels of a truck on the same side of the crane.

6. In a traveling crane the combination with a crane bridge, four compensating frames, one adjacent each corner of the bridge and pivotally supporting the latter, and a pair of trucks for each compensating frame, each frame being journaled to its trucks, of means connecting the two compensating frames on the same side of the bridge, a motor carried by said connecting means and gearing connecting said motor and a truck wheel.

7. In a traveling crane, the combination with a crane bridge, four compensating frames, one adjacent each corner of the bridge and pivotally supporting the latter, and a pair of trucks for each compensating frame, each frame being pivotally supported on its trucks, of means connecting the two compensating frames at each side of the bridge, a motor carried by each of said connecting means and gearing connecting each motor and a truck wheel.

In testimony whereof, I have signed this specification in the presence of two subscribing witnesses.

CLARENCE L. TAYLOR.

Witnesses:
N. C. FETTERS,
D. C. SCHULTZ.